Figure 1:
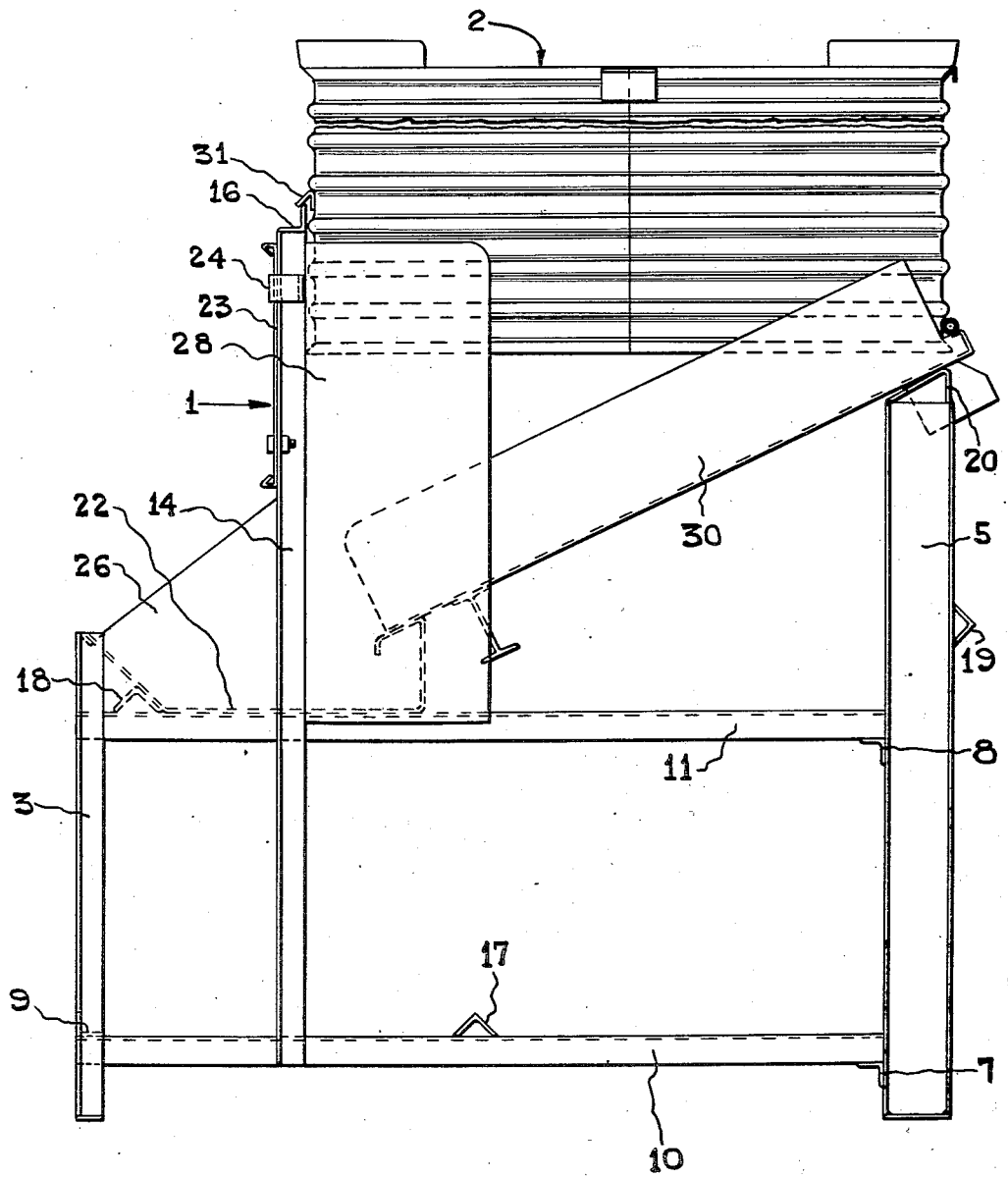

March 18, 1958 L. W. SHEA ET AL 2,827,206
MATERIALS HANDLING EQUIPMENT
Filed April 5, 1954 5 Sheets-Sheet 1

INVENTORS
Lindsey West Shea
Joseph C. Streb and
BY George B. Bole
Frease & Bishop
ATTORNEYS March 18, 1958  L. W. SHEA ET AL  2,827,206
MATERIALS HANDLING EQUIPMENT
Filed April 5, 1954  5 Sheets-Sheet 2

INVENTORS
Lindsey West Shea
Joseph C. Streb and
BY   George B. Bole

Frease & Bishop
ATTORNEYS

March 18, 1958          L. W. SHEA ET AL                    2,827,206
                    MATERIALS HANDLING EQUIPMENT
Filed April 5, 1954                                    5 Sheets-Sheet 3
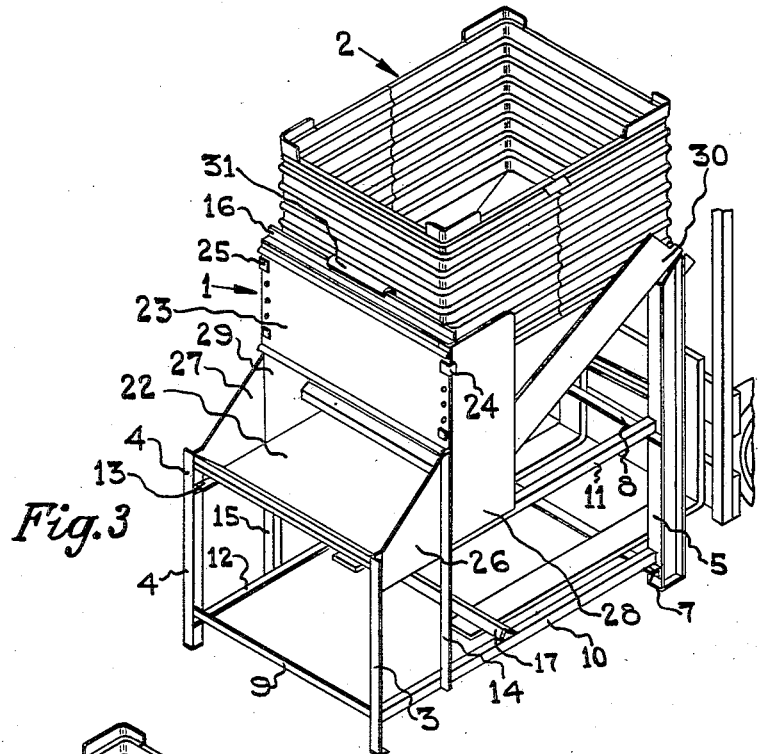
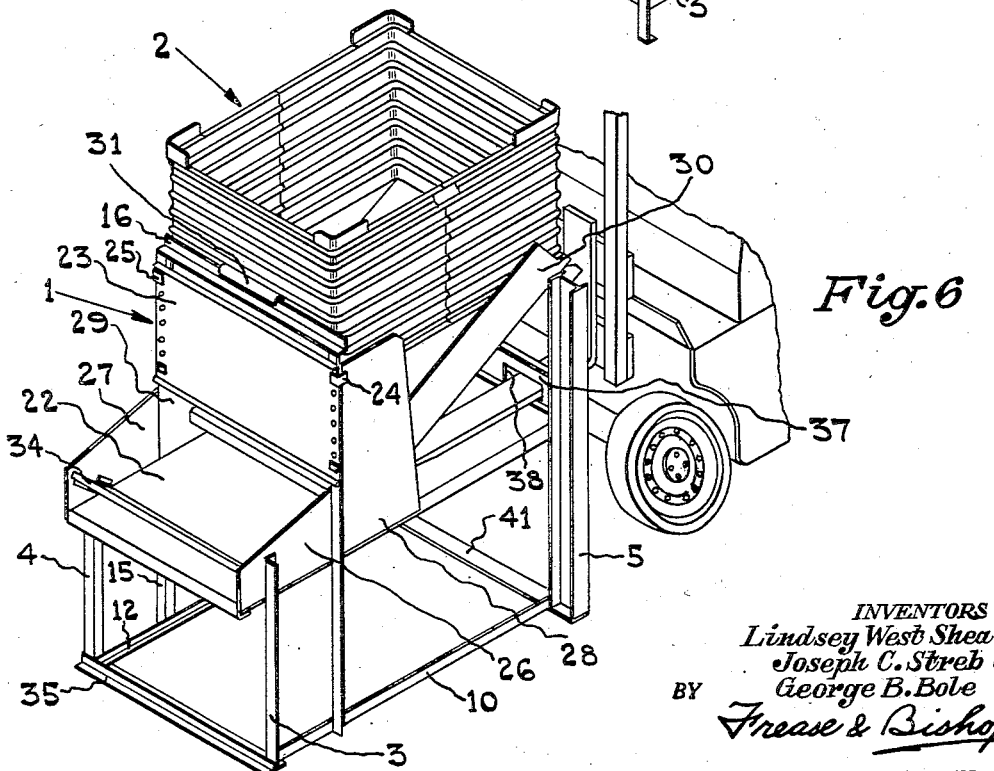
INVENTORS
Lindsey West Shea
Joseph C. Streb and
George B. Bole
BY
Frease & Bishop
ATTORNEYS March 18, 1958 L. W. SHEA ET AL 2,827,206
MATERIALS HANDLING EQUIPMENT
Filed April 5, 1954 5 Sheets—Sheet 5

INVENTORS
Lindsey West Shea
Joseph C. Streb and
BY   George B. Bole
Frease & Bishop
ATTORNEYS

United States Patent Office 2,827,206
Patented Mar. 18, 1958

2,827,206

MATERIALS HANDLING EQUIPMENT

Lindsey West Shea, Joseph C. Streb, and George B. Bole, Canton, Ohio, assignors to The Union Metal Manufacturing Company, Canton, Ohio, a corporation of Ohio Application April 5, 1954, Serial No. 420,801

3 Claims. (Cl. 222—185)

Our invention relates to a new and improved positioning stand used to support bottom dump work boxes and more specifically to a positioning stand adapted to be easily transportable by a fork lift truck and also under which work boxes may be stored.

The invention hereinafter disclosed and described constitutes an improvement of the positioning stands shown and described in the copending applications of Lindsey West Shea and Joseph C. Streb, Ser. No. 254,952 and Lindsey West Shea and Joseph C. Streb, Ser. No. 344,048.

In said applications, Serial No. 254,952, now Patent No. 2,690,277, dated September 28, 1954, and Serial No. 344,048, now Patent No. 2,765,961, dated October 19, 1956, a positioning stand is generally shown and described in cooperative relationship with a materials handling work box. Such work boxes generally comprise bottom dump boxes including a bottom member hinged at one end which drops to an inclined position below the box to discharge the box contents.

The positioning stands that are now in general use are necessarily bulky and of considerable weight and it is difficult to transport them from one location to another and to properly position them beside the machines.

The most common method used is to slide them by hand or other means across floors and into position. This, of course, presents many obvious difficulties.

Also, the positioning stands now in general use, because of their necessary size to support a work box a considerable distance from the floor, take up a great amount of space, yet within the confines of the positioning stand structure beneath the bottom of the work box is a great amount of space which is not used.

It is therefore a general object of the present invention to provide a positioning stand construction which overcomes and eliminates the stated difficulties of prior constructions.

It is a primary object of the present invention to present a positioning stand construction that is easily and conveniently transportable by a fork lift truck.

It is another object of the present invention to present a positioning stand within which work boxes, which are not in use, may be stored.

Finally, it is an object of the present invention to present a positioning stand which accomplishes all of the above objects but is simple in design, inexpensive to manufacture and durable in use.

These and other objects are accomplished by the parts, constructions, arrangements, combinations, and sub-combinations comprising the present invention, the nature of which is set forth in the following general statement, preferred embodiments of which—illustrative of the best mode in which applicants have contemplated applying the principles—are set forth in the following description and illustrated in the accompanying drawings, and which is particularly and distinctly pointed out and set forth in the appended claims forming a part hereof.

In general terms, the improved positioning stand construction constituting the present invention may be stated as including in a materials handling box positioning stand, engagement means by which the positioning stand may be picked up by the forks of a fork lift truck and storage means formed integrally of the positioning stand for storage of spare materials handling work boxes.

More specifically, the improved positioning stand construction constituting the present invention may be stated as including in a materials handling box positioning stand, a structural frame comprised of longitudinally connected end frames, a pan member affixed adjacent to one of the end frames, support means and bearing means on the stand to support a bottom dump work box, engagement means on the stand to be engaged by the lift means of a lift truck, and storage means formed in the structural frame for storage of spare materials handling work boxes.

Figure 2:
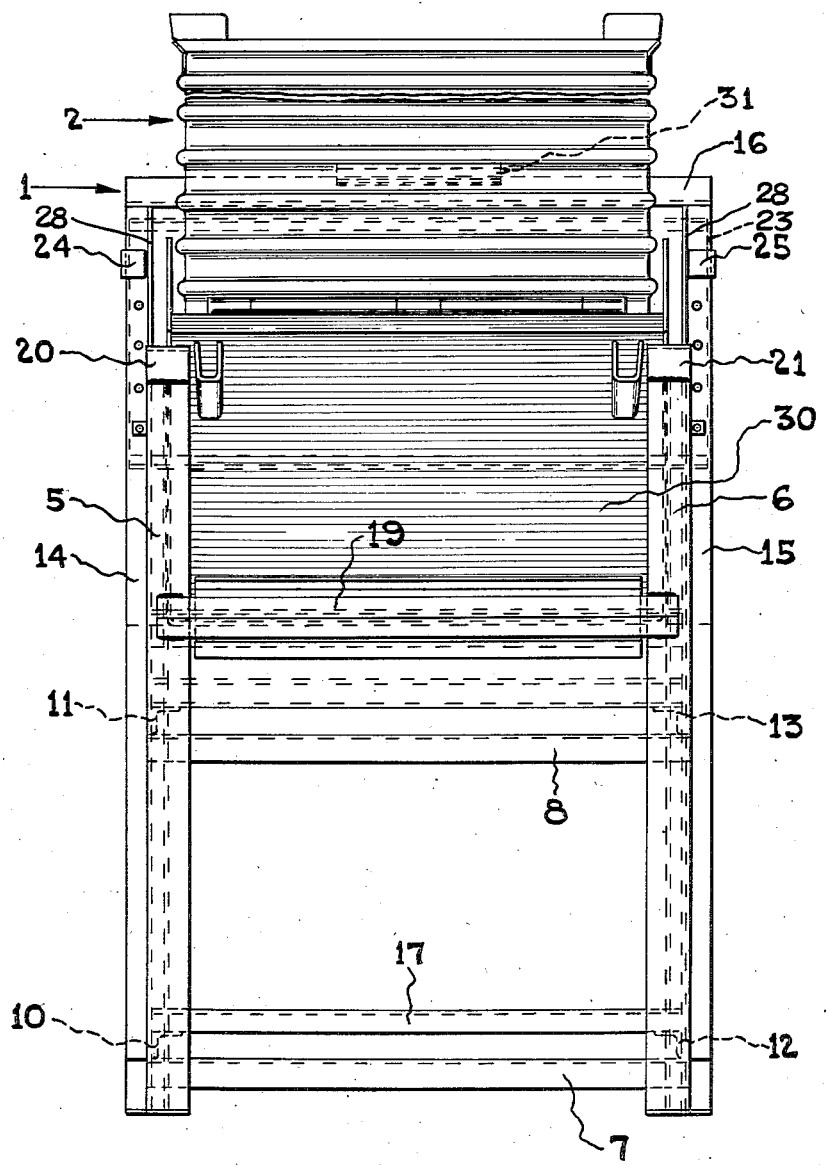
Figure 4:
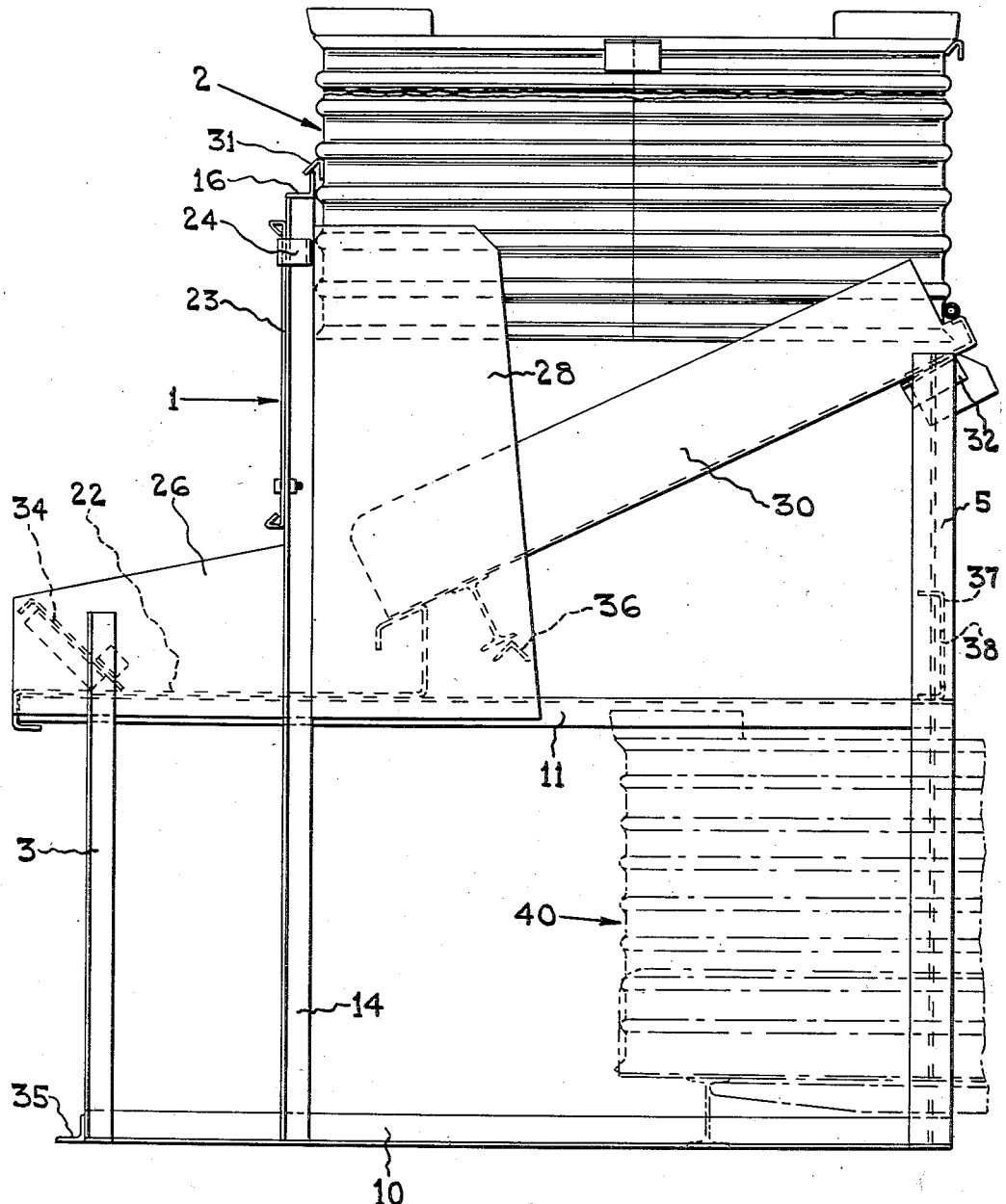
Figure 5:
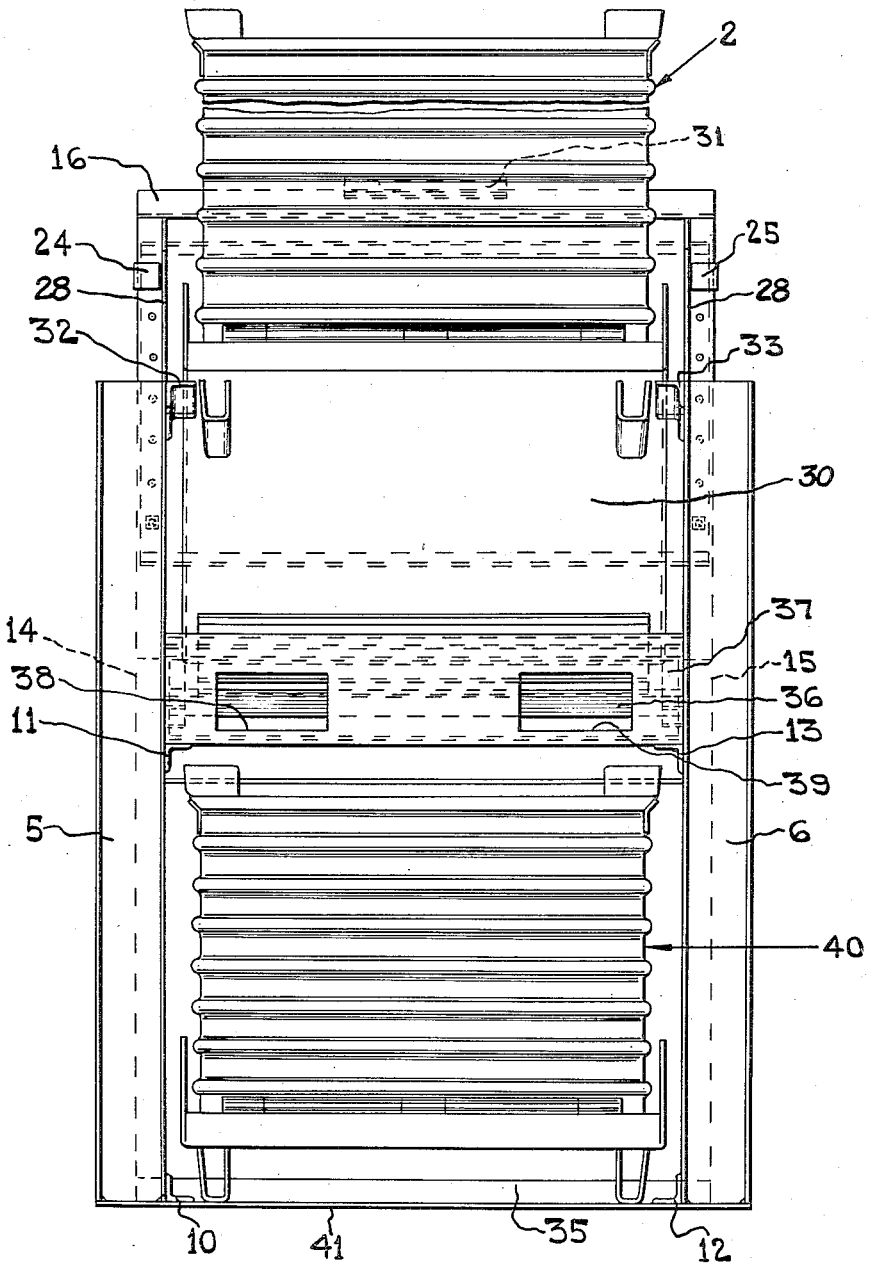

By way of example, embodiments of the improved positioning stand of the present invention are illustrated in the accompanying drawings forming a part hereof, wherein like numerals indicate similar parts throughout the several views, and in which:

Fig. 1 is a side elevation of a positioning stand having the improvements of the present invention for transportation by means of a fork lift truck and with a bottom dump work box positioned thereon;

Fig. 2, a back elevation of the positioning stand shown in Fig. 1;

Fig. 3, a front and side perspective view of the positioning stand shown in Fig. 1 being engaged by the forks of a fork lift truck for transportation;

Fig. 4, another positioning stand construction having the improvements of the present invention for storage of spare work boxes therebeneath and for transportation by a fork lift truck, with a bottom dump work box positioned thereon and with a spare bottom dump work box being inserted into the storage therebeneath by the forks of a fork lift truck;

Fig. 5, a back elevation of the positioning stand shown in Fig. 4; and

Fig. 6, a front side perspective view of the positioning stand of Fig. 4, being engaged by the forks of a fork lift truck for transportation.

The improved materials handling equipment shown in Figs. 1, 2 and 3 is adapted to be easily transportable by a fork lift truck or other similar means. In Figs. 1, 2 and 3, an improved positioning stand unit is generally indicated at 1 supporting a bottom dump work box generally indicated at 2 thereabove.

The improved positioning stand unit 1 includes a generally rectangular three dimensional frame of structural members, the frame having front and rear ends at the left and right respectively in Fig. 1.

The structural frame of the stand includes laterally spaced front corner struts 3 and 4 forming a part of the front end frame and laterally spaced rear corner struts 5 and 6 forming a part of the rear end frame. The front corner struts 3 and 4 are preferably formed from angle members and the rear corner struts 5 and 6 are preferably formed from I-beam members. The front and rear corner struts are so arranged that they generally define a rectangular base pattern for the positioning stand structure.

Joining rear corner struts 5 and 6 laterally are angle stringers 7 and 8. Angle stringer 7 is horizontal and is affixed a measured distance from the bottom end of rear corner struts 5 and 6 and angle stringer 8 is parallel to angle stringer 7 and is affixed a measured distance above it. Joining the front corner struts 3 and 4 laterally is angle stringer 9 affixed a measured distance above the lowermost ends of front corner struts 3 and 4 and in a horizontal plane.

Joining the front and rear corner struts and forming the sides of the positioning stand structure are side angle stringers 10, 11, 12 and 13. The lower side angle stringers 10 and 12 are in a common horizontal plane and are affixed a measured distance from the lowermost ends of the corner struts. Side angle stringers 11 and 13 are parallel to the side angle stringers 10 and 12 and affixed a measured distance above them in a common horizontal plane.

The bottom edges of side angle stringers 10 and 12 abut the top edges of angle stringer 7 and their top edges abut the bottom surface of angle stringer 9. The bottom surfaces of side angle stringers 11 and 13 abut the top surface of angle stringer 8 at their rearmost ends.

Joining the side angle stringers 10 and 11 is vertical angle stringer 14 and joining the side angle stringers 12 and 13 is vertical angle stringer 15. Vertical angle stringers 14 and 15 extend above the side angle stringers 11 and 13 a measured distance and are joined at their top ends by lateral angle stringer 16 as shown.

Front corner struts 3 and 4 extend above the side angle stringers 11 and 13 a measured distance and rear corner struts 5 and 6 extend above side angle stingers 11 and 13 a greater measured distance.

Joining side angle stringers 10 and 12 a measured distance from their front ends and affixed to their top faces is downturned angle stringer 17 and joining side angle stringers 11 and 13 affixed a measured distance from their front ends and on their top faces is downturned angle stringer 18.

Laterally connecting the rear corner struts 5 and 6 and affixed to their back faces a measured distance from their upper ends is inturned angle stringer 19.

Rear corner struts 5 and 6 are cut off at their upper ends horizontally and on top of their upper ends are affixed supporting plates 20 and 21. Supporting plates 20 and 21 are preferably of plate steel and are formed with a backward extending upward angled face starting at the front portion of rear corner struts 5 and 6 and forming an apex at the rear edges of rear corner struts 5 and 6 and then extending vertically downwardly to join the top rear edges of rear corner struts 5 and 6 as shown in Fig. 1.

Abutting the top faces of side angle stringers 11 and 13 a measured distance from their front ends, and also abutting the rear disposed face of downturned angle stringer 18, is a pan member generally indicated at 22. Pan member 22 starts at the top front corner of front corner struts 3 and 4 and extends downwardly and backwardly to the top faces of side angle stringers 11 and 13 and thence rearwardly in a horizontal plane along the top surfaces of the side angle stringers 11 and 13 a measured distance. It then extends vertically upward a measured distance into a downwardly angled portion and then a measured distance into a vertically downward portion as shown in Fig. 1. Pan member 22 is preferably of sheet metal.

Connected to the front surfaces of front corner struts 14 and 15 and joining them laterally is vertical gate member 23. Vertical gate member 23 is affixed to the front corner struts 3 and 4 at its top portion by small flange members 24 and 25 which are affixed to the backs of front corner struts 3 and 4 and extend forwardly and inwardly. Gate member 23 is affixed at its lower portion by means of bolts.

Affixed at their lower ends to the front portions of side angle stringers 11 and 13 and extending from front corner struts 3 and 4 rearwardly to vertical angle stringers 14 and 15, are pan side walls 26 and 27 as shown. Affixed to the outside surfaces of side angle stringers 11 and 13 and also the outside face of vertical angle stringers 14 and 15 and extending to within a measured distance of the top ends of vertical angle stringers 14 and 15 are rectangular side wall plates 28 and 29 as shown.

Bottom dump work box 2 is of rectangular shape with vertical side walls and open top. Its bottom is closed by a hinged bottom wall 30 which is hinged to one of the vertical sides.

When the bottom dump work box 2 is positioned on the positioning stand, the hook member 31 engages over the top edge of angle stringer 16 and the back corners of the work box rest on the angular faces of supporting plates 20 and 21 as shown in Fig. 1. The hinged bottom wall 30 of the box extends angularly downward with its front portion resting on the back upwardly extending portion of the pan member 22 as shown.

When it is desired to transport the improved positioning stand 1, the forks of a fork lift truck may enter over angle stringer 7 and under downturned angle stringer 17 as shown in Fig. 3. The forks of the fork lift truck are inserted until the rear corner struts 5 and 6 rest against the front faces of the vertical portion of the lifting means. The positioning stand 1 may then be raised by means of the fork lift truck and easily transported to any desired location. It is apparent that it is immaterial whether or not the bottom dump box 2 is positioned on the positioning stand 1 during this transporting operation.

It is the primary purpose of angle stringers 19 and 7 to support the rear corner struts 5 and 6. There may be occasions, however, due to the difference in size and design of the many lift trucks in present use, when angle stringers 19 and 7 may serve as abutment members to prevent the stand from tilting backwardly or forwardly during lifting or transportation.

The second form of the improved materials handling equipment which is shown in Figs. 4, 5 and 6 has both improvements of the present invention, that is, of being adapted to be easily transportable by fork lift truck or other similar means, and also having a storage means within the confines of the improved positioning stand in which a spare work box can be stored.

The differences between the first and second forms of positioning stands are described with similar numerals used wherever possible.

The second form of positioning stand shown in Figs. 4, 5 and 6 is of similar structure and has front and rear laterally spaced corner struts 3, 4, 5 and 6. The rear corner struts 5 and 6, however, are spaced laterally a slightly greater distance and contain on their inward sides small angle members 32 and 33.

Small angle members 32 and 33 are affixed to the rear corner struts 5 and 6 so that their front ends are lower than their back ends, with their back ends extending to the top rear corner of rear corner struts 5 and 6. As can be seen in Fig. 4, this is necessary so that they will align with the bottom edges of the hinged bottom 30 of the bottom dump work box 2 when it is opened, and they therefore form a support for the back end of the bottom dump work box.

The second form of positioning stand has a slightly modified form of pan construction having a removable front plate 34 rather than the permanently affixed front plate shown in the first form of the positioning stand. This modification is disclosed in the before mentioned copending application, Ser. No. 344,048.

The side angle stringers 10 and 12 are positioned at the bottom ends of front and rear corner struts 3, 4, 5 and 6, and angle stringer 35 connects the front corner struts 3 and 4 at their lowermost ends and extends from their front faces as shown. Transverse flat strip 41 connects the lowermost ends of rear corner struts 5 and 6 as shown.

The vertical angle stringers 14 and 15 extend down to and are affixed to the side angle stringers 10 and 12.

The side wall plates 28 and 29 have a slightly angled back edge, being of greater width at their lowermost ends than at their top ends. Affixed laterally between is a horizontal downturned angle member 36.

Affixed to the top surfaces of side angle stringers 11 and 13 at their rearmost ends and affixed to and abutting the inside faces of rear corner struts 5 and 6 is a plate member 37. Plate member 37 is of U-shaped cross section as shown in Fig. 4, with one horizontal leg of the U resting on the side angle stringers 11 and 13 and the other horizontal leg of the U being a measured distance thereabove.

In the vertical web portion of the U-shaped member are formed fork entering holes 38 and 39 which are a measured distance apart and a measured distance from the ends of the plate member 37.

In the arrangement of Figs. 4, 5 and 6, a spare work box 40 can be inserted within the confines of the lower portion of the improved positioning stand and there stored.

When it is desired to transport the improved positioning stand to a different location, the stored work box is removed and the forks of a fork lift truck are inserted through the fork entering holes 38 and 39 as shown in Fig. 6 and are extended under the downturned angle member 36 affixed between the side wall plates 28 and 29. The forks of the fork lift truck can then be raised and the improved positioning stand moved off of the floor and transported to any desired location.

Thus, we have presented embodiments of the present invention which include a positioning stand which is easily and conveniently transportable to any desired location by means of a fork lift truck or other similar transporting device, and also an improved positioning stand which provides storage space therebeneath for a spare work box and yet is still and conveniently transportable. Because of the simple structural design of the improved positioning stands, they may be very inexpensively and economically manufactured and yet are very durable in use.

In the two particular embodiments of the present invention in materials handling equipment shown and described herein, each embodiment may be described as having front and rear end frames connected by longitudinally extending members. In the particular embodiment shown in Figs. 1, 2 and 3, the front end frame may include front corner struts 3 and 4, angle stringer 9, the front portions of side stringers 10, 11, 12 and 13, and the vertical stringers 14 and 15; the rear end frame may include the rear corner struts 5 and 6 and one or both of the angle stringers 7 and 8; and the longitudinally extending members may include the side stringers 10, 11, 12 and 13. In the particular second embodiment shown in Figs. 4, 5 and 6, the front end frame may include the front corner struts 3 and 4, angle stringers 35, the front portions of side stringers 10, 11, 12 and 13, and the vertical stringers 14 and 15; the rear end frame may include the rear corner struts 5 and 6 and transverse flat strip 41; and the longitudinally extending members may include the side stringers 10, 11, 12 and 13.

In the foregoing description, certain terms have been used for brevity, clearness and understanding, but no unnecessary limitations are to be implied therefrom, because such words are used for descriptive purposes herein and are intended to be broadly construed.

Moreover, the embodiments of the improved construction illustrated and described herein are by way of example and the scope of the present invention is not limited to the exact details of construction shown.

Having now described the invention, the construction, operation and use of preferred embodiments thereof and the advantageous new and useful results obtained thereby, the new and useful constructions and reasonable mechanical equivalents thereof obvious to those skilled in the art are set forth in the appended claims.

We claim:

1. In materials handling equipment having a hinged bottom dump box and a positioning stand for the box; the positioning stand including end frames, longitudinally extending members connecting the end frames, spaced box support and bearing means mounted on the end frames, spaced laterally extending members, means connecting one laterally extending member to certain of the longitudinally extending members intermediate the end frames, means connecting a second of the laterally extending members to one of the end frames, said second laterally extending member being a channel member and being spaced horizontally from said one laterally extending member, and said channel member having holes formed therein adapted to receive the forks of a fork lift truck therethrough; whereby the forks of a fork lift truck may be received through the second laterally extending member holes and engages beneath the first laterally extending member and the positioning stand transported thereby.

2. In materials handling equipment having a hinged bottom dump box and a positioning stand for the box; the positioning stand including end frames having spaced vertical corner struts adapted to rest on a horizontal surface, longitudinally extending members connecting the end frames, spaced box support and bearing means mounted on the end frames, a first laterally extending member, means connecting said first laterally extending member to certain of the longitudinally extending members intermediate the end frames, a second laterally extending member spaced horizontally from said first laterally extending member connected to one of the end frames connecting the corner struts below the bearing means, said second laterally extending member being a channel member having holes formed therein to receive the forks of a fork lift truck therethrough, and a third laterally extending member connected to said one end frame spaced below said second laterally extending member connecting extreme lower ends of the corner struts to form a rectangular opening through said one end frame and between the longitudinally extending members; whereby the first and second laterally extending members are adapted to be engaged by the lift means of a lift truck for transportation, and a bottom dump box may be selectively positioned on the support and bearing means of the stand for use and a similar spare work box may be stored within the confines of the stand in the rectangular opening.

3. In materials handling equipment as defined in claim 2 in which the third laterally extending member is a horizontal flat strip.

References Cited in the file of this patent

UNITED STATES PATENTS

| 1,706,213 | Cordley | Mar. 19, 1929 |
| 2,440,056 | McIntyre et al. | Apr. 20, 1948 |
| 2,596,908 | McIntyre et al. | May 13, 1952 |
| 2,658,647 | Stoner | Nov. 10, 1953 |
| 2,701,080 | Franklin | Feb. 1, 1955 |